(12) United States Patent
Darnajou et al.

(10) Patent No.: US 12,468,059 B2
(45) Date of Patent: Nov. 11, 2025

(54) METHOD OF MEASURING BY ELECTRICAL IMPEDANCE TOMOGRAPHY

(71) Applicant: COMMISSARIAT A L'ENERGIE ATOMIQUE ET AUX ENERGIES ALTERNATIVES, Paris (FR)

(72) Inventors: Mathieu Darnajou, Pertuis (FR); Guillaume Ricciardi, Le Tholonet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 130 days.

(21) Appl. No.: 18/551,338

(22) PCT Filed: Mar. 25, 2022

(86) PCT No.: PCT/EP2022/057897
§ 371 (c)(1),
(2) Date: Sep. 19, 2023

(87) PCT Pub. No.: WO2022/200558
PCT Pub. Date: Sep. 29, 2022

(65) Prior Publication Data
US 2024/0184010 A1 Jun. 6, 2024

(30) Foreign Application Priority Data
Mar. 26, 2021 (FR) ...................................... 2103099

(51) Int. Cl.
*G01V 3/06* (2006.01)
(52) U.S. Cl.
CPC ...................... *G01V 3/06* (2013.01)

(58) Field of Classification Search
CPC ........................................................ G01V 3/06
USPC .......................................................... 324/693
See application file for complete search history.

(56) References Cited

U.S. PATENT DOCUMENTS

| | | | | |
|---|---|---|---|---|
| 6,147,497 A | * | 11/2000 | Berryman | G01V 3/24 324/357 |
| 6,397,095 B1 | * | 5/2002 | Eyuboglu | G01R 33/54 324/309 |
| 10,226,210 B2 | * | 3/2019 | Arad (Abboud) | A61B 5/4509 |
| 2013/0049770 A1 | * | 2/2013 | Basu | G01N 33/2823 324/693 |
| 2013/0109962 A1 | * | 5/2013 | Uutela | A61B 5/0536 600/476 |

(Continued)

OTHER PUBLICATIONS

Written Opinion of the International Searching Authority (Year: 2022).*

(Continued)

Primary Examiner — Christopher P Mcandrew
(74) Attorney, Agent, or Firm — Oblon, McClelland, Maier & Neustadt, L.L.P.

(57) ABSTRACT

An electrical impedance tomography method for the measurement of a body comprising a cylindrical part containing a fluid, the method comprising arranging a number of electrodes around a periphery of the cylindrical part of the body, simultaneously exciting each of the electrodes, each electrode being excited by a potential of a selected form, measuring the electrical properties of the body using electrodes, and processing the data from measuring step so as to obtain a signed data matrix representative of an image.

7 Claims, 6 Drawing Sheets

(56) References Cited

U.S. PATENT DOCUMENTS

2018/0146881 A1* 5/2018 Gärber ............... A61B 5/6823

OTHER PUBLICATIONS

International Search Report mailed on Jan. 27, 2021 in PCT/EP2022/057897 filed on Mar. 25, 2022 (2 pages).
Preliminary French Search Report dated Nov. 29, 2021 in French Application 2103099 filed on Mar. 25, 2022 (2 pages, with Translation of Categories).
Darnajou Mathieu et al. "High Speed EIT With Multifrequency Excitation Using FPGA and Response Analysis Using FDM", IEEE Sensors Journal, vol. 20, No. 15, 2020, pp. 8698-8710.
Dupre Antoine et al. "A Simultaneous and Continuous Excitation Method for High-Speed Electrical Impedance Tomography with Reduced Transients and Noise Sensitivity", Sensors, 2018, pp. 1-18.
Granot Yair et al. "Frequency-Division Multiplexing for Electrical Impedance Tomography in Biomedical Applications", International Journal of Biomedical Imaging, vol. 2007, Jan. 1, 2007 (Jan. 1, 2007), pp. 1-9.
Gavin Teague. "Mass Flow Measurement of Multi-Phase Mixtures by Means of Tomographic Techniques Acknowledgements", Sep. 1, 2002 (Sep. 1, 2002), 233 pages.
Dupre A. et al. "Simultaneous and Continuous Excitation Strategy for High-speed EIT: the One-Shot method", 9th World Congress on Industrial Process Tomography, Sep. 2018, pp. 467-474.
Darnajou Mathieu et al. "On the Implementation of Simultaneous Multi-Frequency Excitations and Measurements for Electrical Impedance Tomography", Sensors, vol. 19, No. 17, 2019, pp. 1-19.

* cited by examiner

US 12,468,059 B2

METHOD OF MEASURING BY ELECTRICAL IMPEDANCE TOMOGRAPHY

TECHNICAL FIELD

The present invention relates to the field of electrical impedance tomography.

The invention more particularly relates to an electrical-impedance-tomography measuring method that uses simultaneous trigonometric signals to excite the electrodes employed.

The invention also relates to a computer program product configured to implement this measuring method.

The main application targeted by the present invention is monitoring fluid flows that are liable to vary abruptly, as may be the case with flowing fluids under high pressure and at high temperature.

One application of particular interest is monitoring pipes of nuclear installations, but other applications may be envisioned within the context of the invention.

PRIOR ART

Electrical impedance tomography (EIT) is a non-invasive, non-destructive technique that allows an image of the interior of an object to be generated, in real time and continuously, by measuring electrical properties (electrical current and potential) of the surface of the object. This robust approach is particularly suitable for performing non-intrusive measurements in high-pressure and/or high-temperature environments.

EIT more precisely consists in injecting electrical currents or potentials by means of a set of non-intrusive electrodes placed on the surface of the monitored object and then in measuring electrical potentials or currents on the surface of the object.

The electrodes need only make contact with the exterior surface of the object. However, in the case where the surface of the object is made of metal, the electrodes must pass through the wall and make contact with the fluid.

The map of the impedance in the interior of the object is reconstructed by solving the associated inverse problem.

It is known to implement time-division multiplexing whereby an excitation signal is applied to a single pair of electrodes at a time. The various pairs of electrodes are selected sequentially by means of multiplexers or electronic switches so as to allow an EIT image to be obtained.

The EIT image contains the measurement data of all the excited electrode pairs.

These data may be used to determine the distribution of potential and to solve the inverse problem of reconstructing the distribution of the properties of the materials within the object (electrical conductivity, permittivity, etc.).

However, time-division multiplexing does not allow a high rate of acquisition of EIT data to be obtained.

Frequency multiplexing allows a superposition of simultaneously injected signals to be generated, this permitting higher data acquisition rates.

The thesis [1] discloses a method for measuring mass flow rates of various components of a mixture. This method uses an impedance-tomography technique that employs frequency multiplexing.

Publications [2], [3] and [4] each describe a multi-frequency method for simultaneously exciting a plurality of electrodes in the context of an EIT measuring method.

According to this method, each electrode is paired with each of the other electrodes, thus forming a set of paired electrodes. An excitation is simultaneously created between each pair of electrodes by applying a potential to these electrodes, then a measurement of electrical properties is carried out.

The EIT method described in publications [2], [3] and [4] has been successfully implemented in a functional prototype comprising 16 electrodes, this corresponding to a set of 120 paired electrodes.

However, this method has a number of limitations.

Carrying out 120 simultaneous measurements with 120 paired electrodes results in a substantial degree of redundancy in the collected data. Consequently, the measuring operations create significantly more data than the necessary minimum. Thus, the measurements are more complex to exploit, especially at the hardware level. In particular, generation of 120 excitation signals requires an expensive programmable logic array comprising a particularly large memory.

These redundancies also imply use of a high number of excitation frequencies, i.e. 120 different frequencies, this requiring a wide bandwidth, of the order of 500 kHz for an optimized image acquisition rate of 3906 images per second.

Furthermore, exciting the electrodes in pairs leads to data being obtained that are not optimized for solution of the inverse problem and reconstruction of images.

Lastly, the image acquisition rate with this method is limited to 3906 images per second.

However, certain applications require significantly higher acquisition rates. This is for example the case of monitoring nuclear installations. Measurement of fast two-phase flows, for example to monitor for the appearance of breaks in the pipes of nuclear reactors, requires series of measurements taken at acquisition rates of more than 10 000 images per second.

There is therefore a need to provide an EIT measuring method that overcomes the drawbacks of the prior art, especially in order to improve the rate of image acquisition and to optimize the amount of data generated and the processing thereof.

The aim of the invention is to at least partially meet this need.

SUMMARY OF THE INVENTION

To this end, the subject of the invention is, according to one of its aspects, an electrical-impedance-tomography measuring method of a body comprising a cylindrical portion containing a fluid, comprising the following steps:

i. arranging a number $n_e$ of electrodes around a periphery of the cylindrical portion of the body,
ii. simultaneously exciting each of the $n_e$ electrodes, each electrode being excited by a potential $V_n^{exc}$ having the form:

$$V_n^{exc}(t) = A \sum_{m=1}^{n_e} \cos(2\pi f_m t)\left[\delta_m^O \cos(m\theta_n) + \delta_m^E \sin\left(\frac{m\theta_n}{2}\right)\right] \quad \text{[Math 1]}$$

where A is a signal amplitude, $\theta_n$ is the angular position of electrode $E_n$, $f_m = m*f_0$ is an oscillation frequency, $f_0$ is a fundamental frequency chosen such that $f_m$ is less than the Nyquist frequency of the system for all m, iii. measuring electrical properties of the body using the $n_e$ electrodes,
iv. processing the data generated in measuring step iii, this comprising the following sub-steps:

a) for each electrode $E_n$, computing data points $M_n$ defined by:

$$M_n(k) = \frac{1}{RP}\left|\sum_{p=0}^{P-1} V_n^{meas}(p)e^{ik\beta_p}\right| \quad \text{[Math 7]}$$

where R is the resistance of the resistor used to measure $V_n^{meas}$ with $V_n^{meas}=R\,I_n$ across the terminals of the resistor, P is the number of points in a discrete sequence of measurement of the current $I_n$, p is the discrete time, k is a Fourier coefficient comprised between 1 and $(n_e-1)$ and $\beta_p=(2\pi p/P)$, b) constructing a data matrix D from the data points $M_n(k)$ for all n and for all k, according to the equation:

$$D = \begin{pmatrix} \{M_n(1)\} \\ \{M_n(2)\} \\ \{M_n(3)\} \\ \vdots \\ \{M_n(n_e-1)\} \end{pmatrix}. \quad \text{[Math 10]}$$

c) constructing a signed data matrix the elements of which are defined by the following equation when the phase shift $\Phi_{n,l}(k)$ between the excitation potential at electrode 1 and the current measured at electrode n is less than $\pi/2$:

$$\tilde{D}_n^m = \frac{\sin(\Phi_{n,l}(k))}{|\sin(\Phi_{n,l}(k))|} D_n^m. \quad \text{[Math 16]}$$

and the elements of which are defined by the following equation when the phase shift $\Phi_{n,l}(k)$ between the excitation potential at electrode 1 and the current measured at electrode n is greater than or equal to $\pi/2$:

$$\tilde{D}_n^m = \Sigma_n^m D_n^m. \quad \text{[Math 18]}$$

where $\Sigma$ is a sign matrix defined such that the i-th element of the j-th row of $\Sigma$ is the sign of cosine$([2\pi/([j\,1]/2)]*(i-1)/n_e)$ for odd j and the sign of sine$([2\pi/(j/2)]*(i-1)/n_e)$ for even j.

Thus, the measuring method essentially consists in implementing frequency multiplexing in which the excitation signals are simultaneously applied to all the electrodes.

To allow discrimination of the signals, each electrode is excited by a signal of trigonometric form.

Exciting all the electrodes simultaneously avoids the redundancy found in the data obtained by sequentially exciting paired electrodes.

The method according to the invention therefore allows the amount of data generated and their processing speed to be optimized. The obtained number of images per second is thus significantly improved.

Advantageously, the trigonometric form of the excitation signals is particularly well suited to distinguishing between various materials having a similar electrical conductivity.

According to one advantageous feature, the set of potentials $V_n^{exc}$ meets the condition:

$$\sum_{n=1}^{n_e} V_n^{exc}(t) = 0. \quad \text{[Math 5]}$$

Preferably, an image is produced using a one-step iterative least-squares reconstruction algorithm applied to the signed data matrix.

According to one particular embodiment, the electrodes are equidistant from each other. This corresponds to the case where $\theta_n=2\pi n/n_e$. In other words, the electrodes are angularly distributed in a regular manner around the periphery of the body.

The invention also relates to use of the method that has just been described to perform tomographic measurement of a two-phase flow, the body being a pipe of a nuclear installation.

The invention also relates, according to another of its aspects, to a computer program product comprising a medium and, stored on this medium, instructions that are readable by a processor so that, when executed, they allow an acquiring system to be controlled in order to implement the measuring method according to the invention.

The invention lastly relates to a device for implementing the method according to the invention, comprising:
- an acquiring system comprising at least one programmable logic array, a module for generating analog signals and a module for measuring analog signals;
- a computer configured to control the acquiring system;
- a plurality of electrodes connected to the acquiring system.

DETAILED DESCRIPTION

Figure 1:
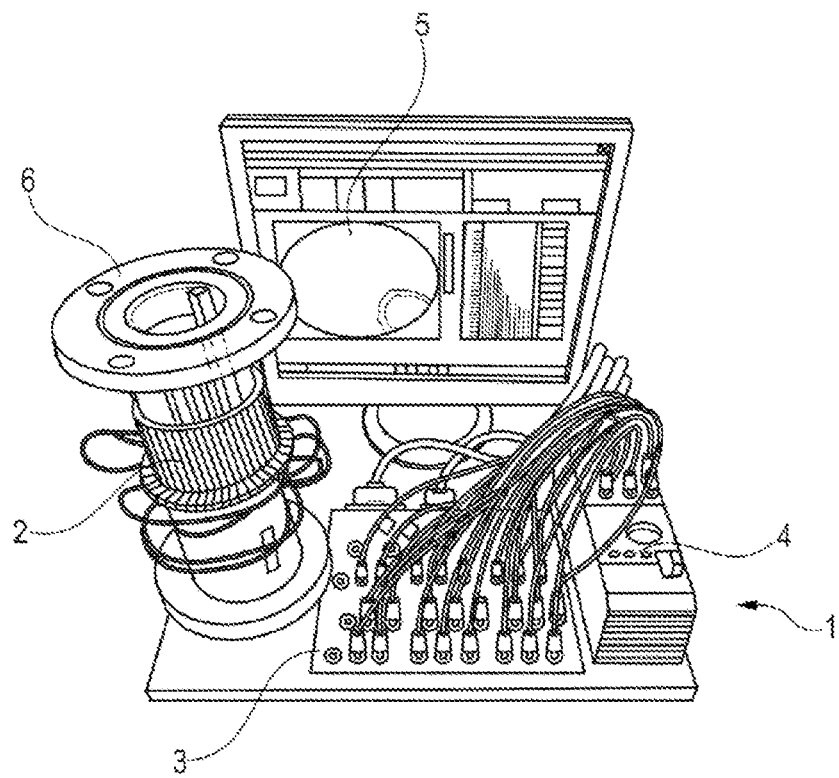
FIG. 1 shows a device for implementing the measuring method according to the invention.

FIG. 1 illustrates a device 1 for implementing the EIT measuring method according to the invention.

The method aims to take, by EIT, measurements of a body 6 containing a fluid.

The device 1 comprises 16 electrodes (referenced 2) arranged non-intrusively on a circular periphery of the body 6. The electrodes 2 are preferably angularly distributed in a regular manner around the periphery of the body 6.

The electrodes 2 are connected to a printed circuit board 3, itself connected to a data-acquiring system 4. A screen 5 allows the data and images produced from these data to be viewed. The data-acquiring system 4 contains a Linux operating system (HOST), which controls a programmable logic array (FPGA) also contained in the data-acquiring system 4.

The acquiring system 4 allows analog excitation signals to be generated and the analog measurement signals delivered by the electrodes 2 to be measured.

The system 4 for example comprises a cRIO-9039 controller from the manufacturer National Instruments, which includes a programmable logic network, NI-9262 modules from the manufacturer National Instruments for generating analog excitation signals and NI-9223 modules from the manufacturer National Instruments for measuring the analog signals delivered by the electrodes 2.

Implementation of the measuring method according to the invention with a device such as shown in FIG. 1 will now be described.

In a first step of the measuring method, a number $n_e$ of electrodes 2 is placed around a periphery of a cylindrical portion of the body 6.

Exciting the Electrodes

In a second step of the measuring method, the electrodes are simultaneously excited by a potential having a well-chosen form.

The electrodes 2 form a set of linearly independent electrodes. They are used to create electrical excitations on the surface of the body, and to measure the electrical properties thereof.

For a number $n_e$ of electrodes, there are $(n_e-1)$ linearly independent excitation patterns. To describe these linearly independent patterns it is natural to choose Fourier basis functions, according to the equation:

$$\frac{1}{\sqrt{2\pi}} e^{in\theta} \qquad \text{[Math 2]}$$

The method according to the invention consists in simultaneously exciting all of the electrodes using excitations of trigonometric form.

This set of simultaneous excitations is broken down into spatial oscillations in the Fourier basis and into temporal oscillations.

Various frequencies are employed in order to establish a distinction between the various frequency-multiplexed trigonometric signals.

For each trigonometric excitation pattern, each electrode $E_n$ is associated with one static voltage $V_n^{sta}$.

The set of $n_e$ static voltages $V_n^{sta}$ forms a set of sinusoidal and cosinusoidal functions having various spatial frequencies m.

Figure 2:
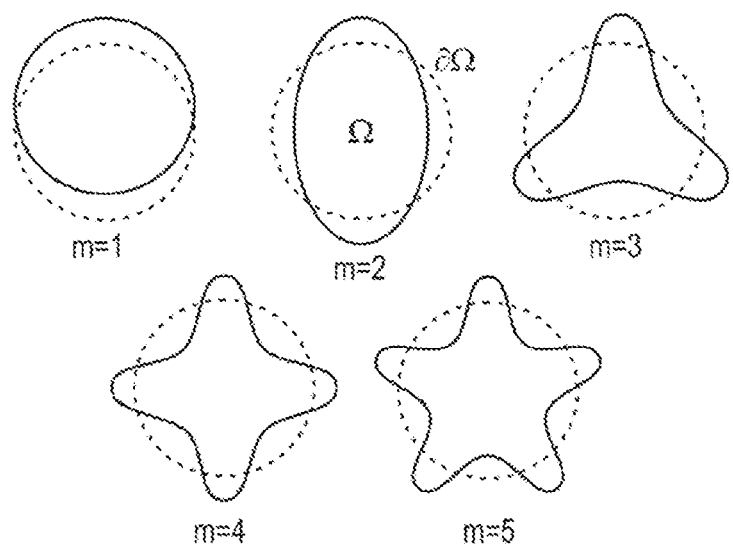
FIG. 2 illustrates spatial cosine patterns.

FIG. 2 shows the spatial cosinusoidal patterns for m varying from 1 to 5. The sinusoidal patterns have not been shown.

The $n_e$ electrodes are arranged on the body's periphery $\partial\Omega$, which has been represented by the dashed lines in FIG. 2. The continuous lines represent the excitation potential applied to the electrodes.

The static potential $V_{n,m}^{sta}$ associated with each electrode $E_n$ is defined by the following equation, for n comprised between 1 and $n_e$:

$$V_{n,m}^{sta} = A\left[\delta_{mcos}^{\mathbb{O}}(m\theta_n) + \delta_m^{\mathbb{E}}\sin\left(\frac{m\theta_n}{2}\right)\right],$$

where m ∈ 1, ..., $(n_e-1)$ represents spatial frequency,
$\mathbb{O}$ = {2k+1:k∈ ℕ } is the set of odd integers,
$\mathbb{E}$ = {2k:k∈ $\delta_m^{\mathbb{O}}$ *} is the set of non-zero even integers,
δ is the Kronecker delta with ℕ =1 if m∈ $\mathbb{O}$ and $\delta_m^{\mathbb{O}}$ =0 otherwise,
$\theta_n = 2\pi i_e$ is the angular coordinate of electrode $E_n$,
A is the amplitude of the applied voltage.

For a given set of $n_e$ electrodes, all the independent excitation patterns are fully described with $(n_e-1)$ different spatial frequencies.

For the particular case where $\theta_n=2\pi n/n_e$, the electrodes are regularly distributed over the periphery of the body.

Each spatial frequency m is associated with a temporal frequency $f_m$ and is applied simultaneously to each of the electrodes.

Thus, each simultaneous excitation potential $V_n^{exc}$ comprises a superposition of $(n_e-1)$ trigonometric functions, each function oscillating at a particular frequency $f_m$. The excitation signal of an electrode n is $V_n^{exc}$, as defined by the following equation:

$$V_n^{exc}(t) = \sum_{m=1}^{n} \cos(2\pi f_m t) V_{n,m}^{sta} \qquad \text{[Math 4]}$$
$$= A\sum_{m=1}^{n_e} \cos(2\pi f_m t)\left[\delta_m^{\mathbb{O}}\cos(m\theta_n) + \delta_m^{\mathbb{E}}\sin\left(\frac{m\theta_n}{2}\right)\right]$$

The method according to the invention comprises a step consisting in simultaneously applying each potential $V_n^{exc}(t)$ thus defined to each electrode $E_n$.

Care is taken to ensure that the sum of the excitation voltages of the $n_e$ electrodes is zero whatever the time t. This is expressed by the condition:

$$\sum_{n=1}^{n_e} V_n^{exc}(t) = 0. \qquad \text{[Math 5]}$$

Measuring the Electrical Properties of the Body

In a third step of the measuring method, the electrical properties of the body 6 are measured using the electrodes 2.

A computer controls the programmable logic network of the acquiring system 4 so as to generate 16 excitation signals having the described properties. These 16 digital signals are converted into analog signals by the NI-9262 modules and transmitted by coaxial cables to the electrodes 2.

Figure 3:
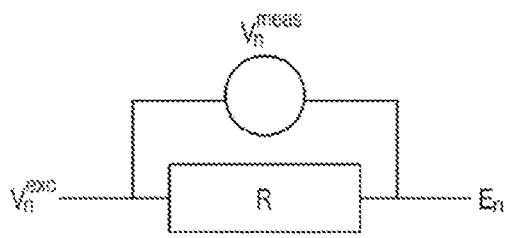
FIG. 3 shows one portion of an electronic circuit allowing an electrode to be excited.

The printed circuit board 3 comprises one exciting circuit for each electrode 2, each of these circuits comprising a resistor R as illustrated in FIG. 3. As may be seen in this figure, the potential $V_n^{exc}$ is applied to one side of the resistor R, the other side being connected to the electrode $E_n$.

The Neumann boundary condition at electrode $E_n$ is the current $I_n$ passing through the exciting circuit. This current is obtained by measuring the voltage $V_n^{meas}$=R $I_n$ across the terminals of the resistor. As for $V_n^{exc}$, this signal is a sum of trigonometric functions.

Processing the Data

In a fourth step of the measuring method, the data measured in the third step are processed in order to obtain a signed data matrix representative of an image.

Generating Data Points $M_n$

In a first sub-step of the fourth step of the measuring method, data points $M_n$ are computed for each electrode n.

The Fourier transform of the measured signal $V_n^{meas}$ is computed from a P-point current measurement sequence $I_n(p)$, where p is discrete time and respects $0 \leq p \leq P$, namely:

$$X_n(k) = \mathcal{F}[I_n(p)] = \frac{\theta}{R}\sum_{p=0}^{P-1} V_n^{meas}(p) e^{ik\beta_p} \qquad \text{[Math 6]}$$

-continued where $\beta_p = \dfrac{2\pi p}{P}$, $i = \sqrt{-1}$ and the normalization factor $\theta = \dfrac{1}{P}$.

The Fourier transform may be computed at a frequency $f_1$, which corresponds to the frequency at which P Fourier coefficients are computed.

The frequencies $f_m$ of the voltages $V_n^{exc}$ are chosen to be harmonics of $f_1$. This makes it possible to distinguish between the measured signals. Thus, each coefficient k is associated with one particular frequency $f_m$.

The data are thus generated at a frequency $f_1$ and the resolution in Fourier space is $\Delta f = f_{m+1} - f_m = f_1$. It should be noted that the highest frequency is chosen to be lower than the Nyquist frequency of the system $f_{Nyq} = \frac{1}{2}\Delta p$, where $\Delta p$ is the sampling time.

The data points $M_n(k)$ are the moduli of each Fourier coefficient k for each electrode n:

$$M_n(k) = \dfrac{1}{RP}\left|\sum_{p=0}^{P-1} V_n^{meas}(p) e^{ik\beta_p}\right| \qquad \text{[Math 7]}$$

Each data point defines the current of a given trigonometric pattern at a given electrode. The set of data points $M_n(k)$ for all n and all k forms the measurement data.

The excitation frequencies are determined in the following way. The sampling frequency $f_{DAQ}$ of the data-acquiring system limits the maximum frequency $f_m$ of the voltages $V_n^{exec}$, the Nyquist frequency $f_{Nyq} = f_{DAQ}/2$ being an upper limit.

For a data-acquiring system such that $f_{DAQ}=1$ MS/s, the Nyquist frequency is equal to 500 KHz.

To avoid small residual-voltage errors resulting from energy stored in the electrode-electrolyte contact impedance, continuous signals must be delivered. To generate continuous signals at various frequencies, the signals are chosen to be harmonics of the lowest generated frequency $f_1$.

When application of potential to an electrode is stopped, some of the electrical energy is stored for a few tens of microseconds at the interface between the electrode and the medium. This contact-impedance effect leads to an error in the measurement and implies the need to introduce a dead time between two successive excitations, to allow this energy to dissipate. Generation of continuous signals has the advantage of meaning that the applied voltages never stop, and therefore of avoiding errors related to contact impedance and the need to introduce dead times.

With 16 electrodes, a set of excitation signals at 15 different frequencies is generated. Given the sampling rate of the acquiring system, for example 1 MS/s, the frequencies may be chosen such that $f_i = i*f_0$ where $f_0$ is the fundamental frequency and i is comprised between 1 and 15.

Furthermore, the discrete Fourier transforms may be performed at P=32 points because only positive results are considered. This results in a rate of acquisition of image data of $1*10^6/32 = 31\,250$ images per second. This choice implies that the lowest sinusoidal-signal frequency $f_1$ must be equal to the frequency of computation of the discrete Fourier transforms. The highest frequency $f_{15} = 15*f_0$ is 468.875 kHz, which is below the Nyquist limit of 500 kHz for the system under consideration.

The excitation amplitudes are determined in the following way.

The voltage generation and acquiring modules operate in an interval of ±10 V. Considering the voltages $V_n^{exc}$, the amplitude A of the sinusoids must be significantly lower than the sum of the sinusoids generated due to constructive interference. However, the amplitude A of the signal must be as large as possible to minimize signal-to-noise ratio.

Another limit to take into consideration is the permitted maximum variation between two successively generated potentials. Real-time control in the acquiring system makes it possible to choose a satisfactory value of A=0.15 V, which gives resonant peaks of ±2.25 V. The rapid transition between positive and negative values of the signal prevents the appearance of electrolytic effects. For example, an electrolysis-related effect appears in water when a DC voltage higher than 1.2 V is applied. This effect does not appear at AC voltages higher than 1.2 V if these voltages vary rapidly enough.

Obtaining a Data Matrix D

In a second sub-step, a data matrix D is obtained from the data points $M_n$.

For the 16-electrode system in question, which employs NI-9223 modules, a fixed-point data format of 20 number-allocated bits, including 5 bits for precision digits, may be used. The index n of the electrodes, which is comprised between 1 and 16, and the Fourier coefficient k, which is comprised between 1 and 15, may be described by binary numbers coded on 4 bits.

For a 32-electrode system, each data-point modulus $M_n(k)$ is coded with the numbers n and k in the following form:

$$M_n(k) = \underbrace{\langle +, 8, 0\rangle}_{k} + \underbrace{\langle +, 8, 0\rangle}_{n} + \underbrace{\langle \pm, 16, 11\rangle}_{M}, \qquad \text{[Math 8]}$$

where the fixed-point format <s, b, p> is used with s: signed/unsigned; b: number of bits allocated; p: number of precision bits. The data $M_n(k)$ are encoded in U32 format.

The $n_e$ data points measured on the $n_e$ electrodes for a given Fourier coefficient k, i.e. for a given frequency $f_m$, give the following data vector:

$$\{M_n(k)\} = (M_1(k) M_2(k) M_3(k) \ldots M_{n_e}(k)) \qquad \text{[Math 9]}$$

where the $M_n(k)$ are integers encoded in U32 format.

The $n_e - 1$ vectors may be concatenated into a data matrix D:

$$D = \begin{pmatrix} \{M_n(1)\} \\ \{M_n(2)\} \\ \{M_2(3)\} \\ \vdots \\ \{M_n(n_e - 1)\} \end{pmatrix}. \qquad \text{[Math 10]}$$

The size of the data is then $S = n_e (n_e - 1)$.

Only the moduli of the Fourier transforms form part of the data.

For an image, the size of the data is $S*32$ bits=4 kB. In comparison, the method described in publications [2], [3] and [4] results in 127 kB of data per image, without additional information on the boundary conditions.

Thus, the method according to the invention allows a higher image acquisition rate and also allows the size of the data to be reduced by a factor $n_e/2$ with respect to the method described in publications [2], [3] and [4].

Obtaining a Signed Data Matrix

In a third sub-step, a signed data matrix representative of an image is obtained.

The Fourier transforms yield a modulus and a phase. The sign of each data point is estimated from the phase.

Thus, considering an excitation signal applied to each electrode $E_n$ at a frequency $f_m$ having the form:

$$V_{n,m}^{exc}(t) = A\cos(2\pi f_m t)\left[\delta_m^\odot \cos(m\theta_n) + \delta_m^E \sin\left(\frac{m\theta_n}{2}\right)\right], \quad [\text{Math 11}]$$

The phase of the signal is expressed:

$$\phi_n^V(k) = \arctan\left(\frac{-\sum_{p=0}^{P-1} V_{n,m}^{meas}(p)\sin(k\beta_p)}{\sum_{p=0}^{P-1} V_{n,m}^{meas}(p)\cos(k\beta_p)}\right). \quad [\text{Math 12}]$$

The phase of the current $I_l^{meas}(t)$ measured at electrode $E_l$ at the frequency $f_m$ is:

$$\phi_l^I(k) = \arctan\left(\frac{-\sum_{p=0}^{P-1} I_l^{meas}(p)\sin(k\beta_p)}{\sum_{p=0}^{P-1} I_l^{meas}(p)\cos(k\beta_p)}\right). \quad [\text{Math 13}]$$

Assuming synchronous sampling of the input of the analog signal AI and the output of the sampled signal AO, the phase shift between the excitation potential and the measured current is:

$$\Phi_{n,l}(k) = \phi_n^I(k) - \phi_l^V(k). \quad [\text{Math 14}]$$

The phase shift depends on the design of the EIT sensors and on the nature of the flow within the body. If the phase shift is large, wrap-around effects may make reconstruction of the sign of the data impossible. Specifically, phase is symmetric to a transformation of $2\pi N$, where N is an integer. If the phase is greater than $2\pi$, it wraps around on itself.

The following two cases have been identified:

$$|\Phi_{n,l}(k)| < \pi/2 \text{ and } |\Phi_{n,l}(k)| \geq \pi/2. \quad [\text{Math 15}]$$

In the first case, the sign of the data points is computed using the preceding equation. The element of the signed data matrix corresponding to the k-th Fourier coefficient and to the n-th electrode is then:

$$\tilde{D}_n^m = \frac{\sin(\Phi_{n,l}(k))}{|\sin(\Phi_{n,l}(k))|} D_n^m. \quad [\text{Math 16}]$$

In the second case, the wrap-around effects prevent estimation of the sign of $D_n^k$. A sign matrix $\Sigma$ is then introduced to allocate an arbitrary sign to the data.

The sign matrix $\Sigma$ is estimated based on the sign of the excitation signal at $t=0$ for a given harmonic at a given electrode, by introducing the sign function:

$$\sum_{n,m} = \begin{cases} 1 & \text{if } V_n^{meas} > 0, \\ 0 & \text{if } V_n^{meas} = 0, \\ -1 & \text{if } V_n^{meas} < 0 \end{cases} \quad [\text{Math 17}]$$

with $V_n^{meas}$ such as defined above.

The sign matrix $\Sigma$ is more particularly defined so that its rows represent the signs of a cosine function in alternation with those of a sine function having an integer number of periods on each row. The first two rows have a single period and the number of periods increases by one for each pair of subsequent rows.

In other words, the rows of the sign matrix $\Sigma$ are defined such that the i-th element of the j-th row is the sign of cosine($[2\pi/([j+1]/2)]*(i-1)/n_e$) for odd j and sine($[2\pi/(j/2)]*(i-1)/n_e$) for even j.

For example, the first element of the first row of the sign matrix is the sign of cosine(0), i.e. +. For a number of electrodes $n_e$ equal to 16, the sign of the fifth element of the first row is the sign of cosine($2\pi*[4/16]$), i.e. 0.

Thus, the first row of the sign matrix represents the signs of one period of a cosine function, i.e. the signs of cosine $(2\pi*(i-1)/n_e)$ for the i-th element in the row. The second row represents the signs of one period of a sine function, i.e. the signs of sine($2\pi*(i-1)/n_e$). The third row represents the signs of two periods of a cosine function, i.e. the signs of cosine($[2\pi/2]*(i-1)/n_e$). The fourth row represents the signs of two periods of a sine function, i.e. the signs of sine($[2\pi/2]*(i-1)/n_e$). The fifth row represents the signs of three periods of a cosine function, i.e. the signs of cosine($[2\pi/3]*(i-1)/n_e$), and so on until the $(n_e-1)$-th row.

Figure 7:
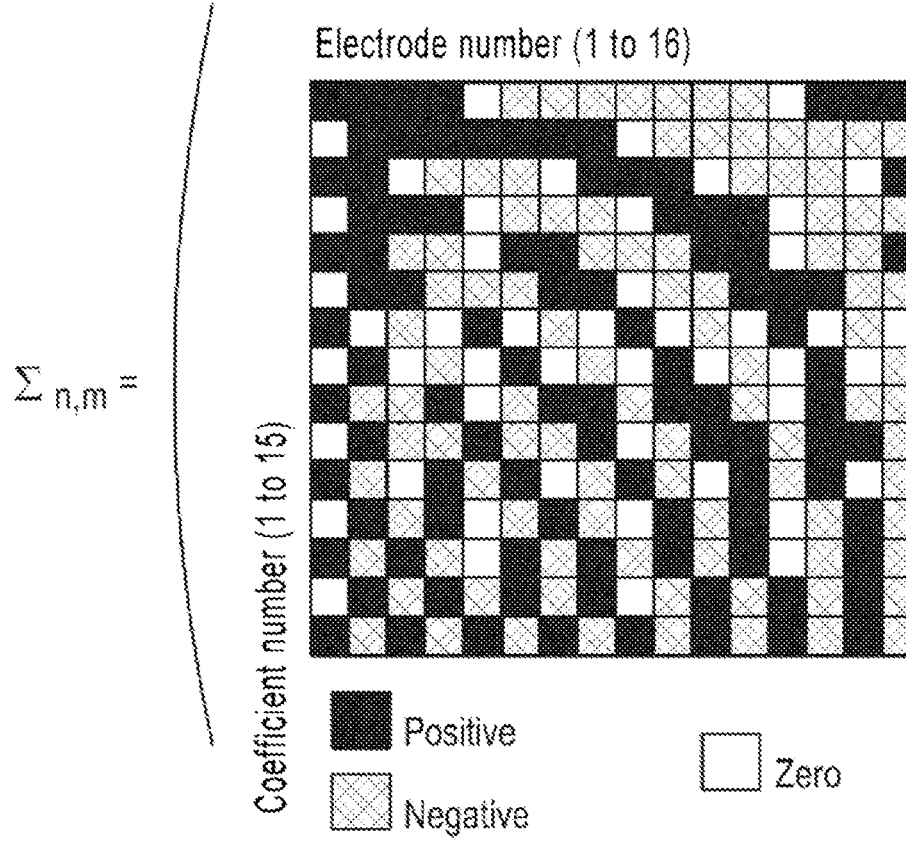
FIG. 7 illustrates a sign matrix for a device comprising 16 electrodes.
Figure 8:
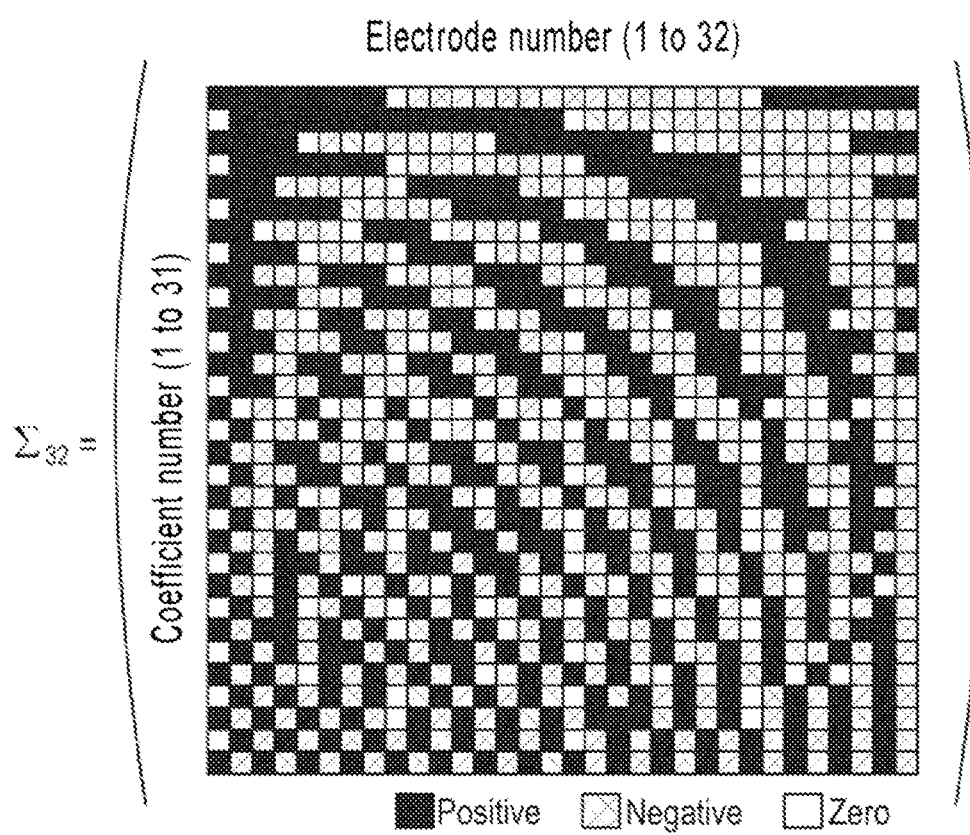
FIG. 8 illustrates a sign matrix for a device comprising 32 electrodes.

For example, for a 16-electrode device, the sign matrix takes the form shown in FIG. 7. For a device with 32 electrodes, the sign matrix takes the form illustrated in FIG. 8.

Use of such a sign matrix makes it possible to optimize the processing of the data to form an image. It allows the sign of each data point to be estimated and an image to be reconstructed.

For a large phase shift, i.e. larger than or equal to $\pi/2$, the arbitrarily signed amplitudes of the $n_e-1$ excitation patterns of the $n_e$ electrodes, or in other words the elements of the signed data matrix corresponding to the k-th Fourier coefficient and to the n-th electrode, are given by:

$$\tilde{D}_n^m = \Sigma_n^m D_n^m. \quad [\text{Math 18}]$$

Algorithmic Implementation

The HOST portion of the acquiring system 4 continuously sends the frequency and amplitude parameters to the FPGA of the acquiring system 4.

Figure 4:
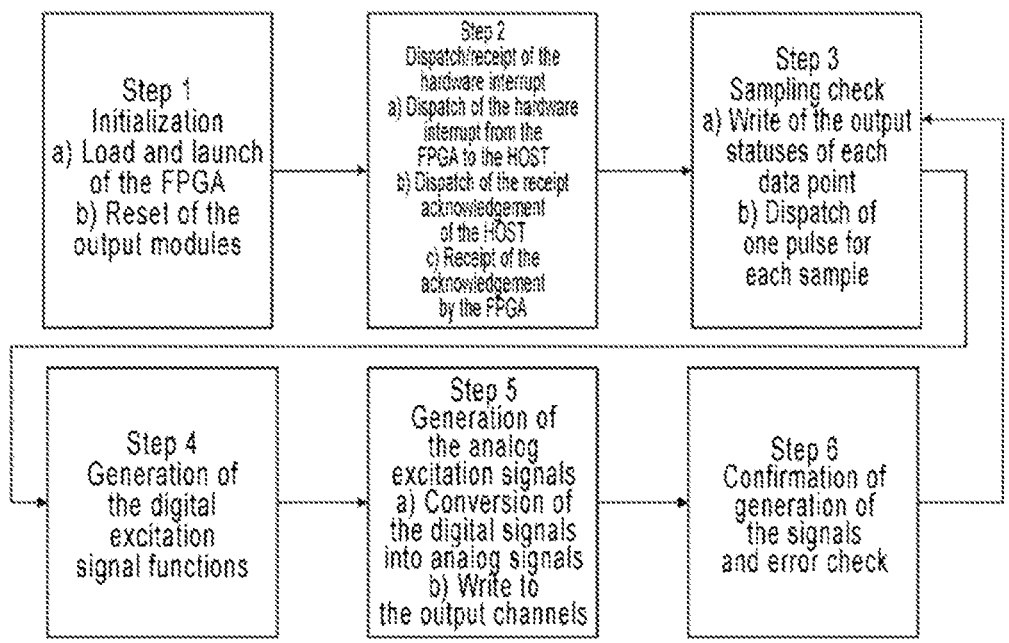
FIG. 4 illustrates a method for generating excitation signals.

FIG. 4 illustrates an algorithm for generating the excitation signals of the 16 electrodes 2.

With the system considered, the FPGA receives data points 16 by 16 in a loop clocked at 1 MS/s to create 16 analog signals.

In a first step, the system is initialized.

To start with the FPGA is empty. The HOST loads the FPGA, then the NI-9262 modules are reset.

In a second step, an interrupt request is sent and received. A hardware interrupt is used to notify the HOST when the FPGA is ready to begin data acquisition. The FPGA waits for HOST validation to begin acquisition.

In a third step, sampling is checked.

A sample-pulse generation function is called to begin generating data points. The frequency at which the function is called determines the sampling rate used to generate the data points. In parallel, an I/O status write function is called at the same frequency to check the status of each generated sample.

In a fourth step, digital excitation signal functions are generated.

The HOST commands the FPGA to begin generating the excitation signal functions.

In a fifth step, analog excitation signals are generated. The sixteen excitation signals are sent to the electrodes.

In a sixth step, the HOST confirms the generation of the signals and reports any errors at the HOST or FPGA level.

Steps 1 and 2 are performed once, when the algorithm is launched. Steps 3 to 6 are iterated for each output point, at the sampling frequency.

The sampling frequency may be comprised between 10 kHz and 500 MHZ, and preferably between 500 kHz and 50 MHz.

Figure 5:
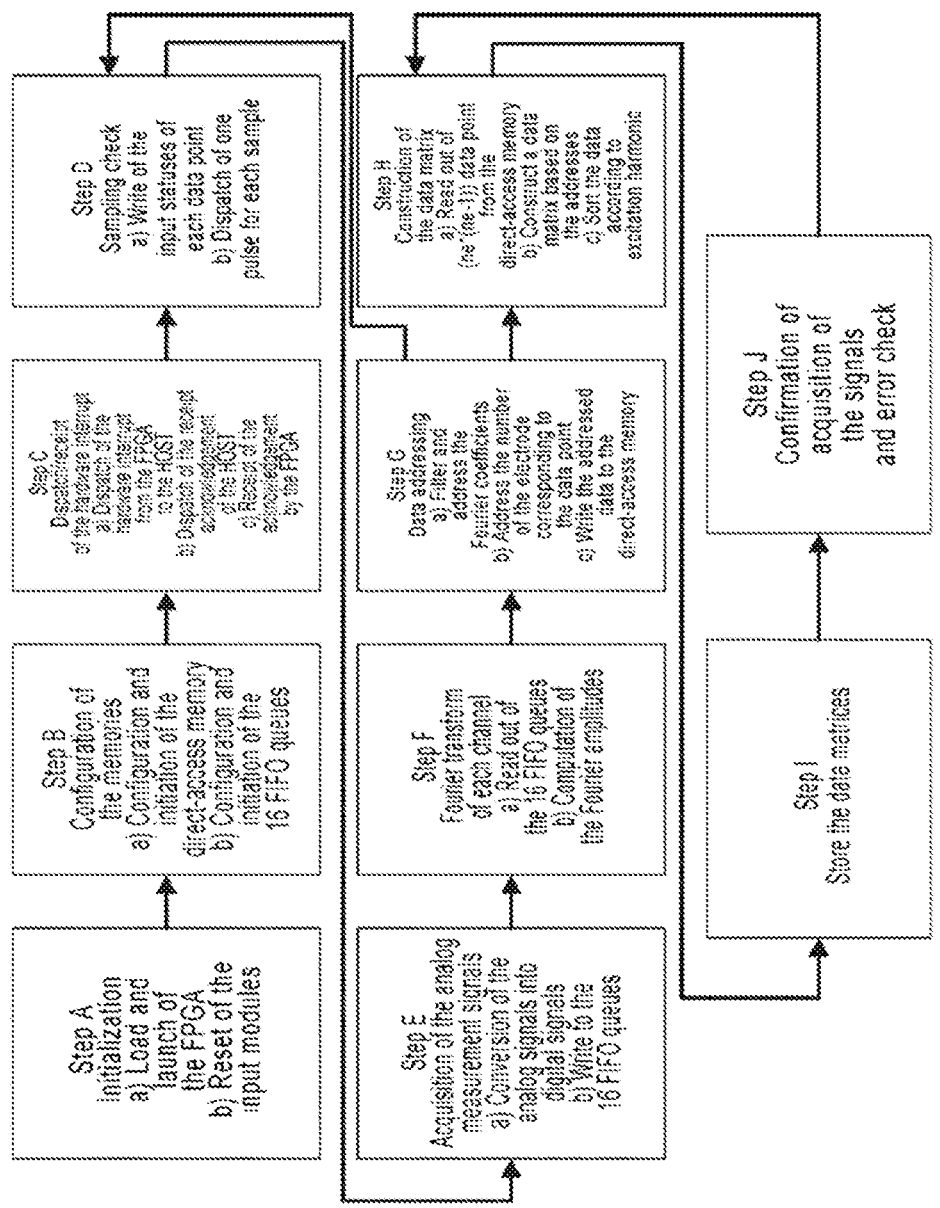
FIG. 5 illustrates a method for measuring the signals generated by the electrodes.

FIG. 5 shows an algorithm for processing data received from the electrodes 2.

Measurement of the voltages across the terminals of the resistors R allows the Neumann boundary conditions to use in the implementation of the image reconstruction algorithm to be deduced. The acquisition rate of 1 MS/s on 16 channels corresponds to a data transfer rate of 320 MB/s.

Using fast Fourier transforms while only considering Fourier coefficients related to a generated signal allows the size of the data to be reduced without impacting their quality. It also acts as an effective band filter. However, the real-time computation of 16 fast Fourier transforms requires a high computing capacity. The FPGA, which permits real-time and parallel transformation of signals into their Fourier components on a plurality of channels, is a tool suitable for carrying out this task.

In a first step A, the system is initialized.

The FPGA resets the NI-9223 analog-signal-acquiring modules.

In a second step B, the memories are configured.

The HOST configures and initiates direct access to the memory of the FPGA. The FPGA configures and initiates sixteen first-in-first-out queues to ensure communication between the sixteen measurement channels and their fast-Fourier-transform computations.

In a third step C, an interrupt request is sent and received.

A hardware interrupt makes it possible to ensure that the queues and direct memory access are ready.

In a fourth step D, sampling is checked.

A sample pulse generation function is called to control the sampling frequency and an I/O status read function is called at the same frequency to check the status of each sample and report any errors to the HOST.

In a fifth step E, the analog measurement signals are acquired.

The I/O read function is configured to read out a single sample from each channel of each NI-9223 module. This function is called at 1 MHz and regulated by the sample pulse generation function.

In a sixth step F, the fast Fourier transform of each channel is computed in a 1 MHz loop. The computation time is determined by the number P of points considered in the Fourier transform. Once the P measured data points have been transferred for the Fourier-transform computations, the function returns the P Fourier coefficients one by one in each iteration of the Fourier-transform loop. Subsequently, the amplitudes of the Fourier coefficients are computed at a frequency of 1 MHz.

In a seventh step G, the data are addressed.

The amplitude data points in U32 format form, with the corresponding Fourier coefficient (in U16 format) and the corresponding channel (in U16 format), a data element in U64 format. In each iteration of the Fourier transform loop, 16 elements are written for the 16 channels to the direct-access memory, with a view to being transmitted to the HOST.

In an eighth step H, the data matrix is constructed.

The HOST waits for the direct-access memory to collect at least 240 elements, representing a complete data image. The address of the n-th electrode and the Fourier coefficient associated with the amplitude are used to form the data matrix D.

In a ninth step I, the data matrices are stored.

The data are used to perform real-time image reconstruction or are stored. The image is based on a one-step iterative least-squares reconstruction algorithm, for example the algorithm described in publication [5].

The real-time image reconstruction may generate about one hundred images per second.

In a tenth step J, acquisition of the signals is confirmed and an error check is carried out.

Synchronization of the analog-signal-generating and -measuring modules is checked and any errors are reported.

Steps A to C are performed once, when the algorithm is launched. Steps D to G are iterated for each output point, at the sampling frequency. Once a complete data matrix containing $n_e*(n_e-1)$ data points has been acquired, the algorithm passes to step H. Steps H to J are iterated at the image-acquisition frequency.

The sampling frequency may be comprised between 10 KHz and 500 MHZ, and preferably between 500 KHz and 50 MHz.

Figure 6:
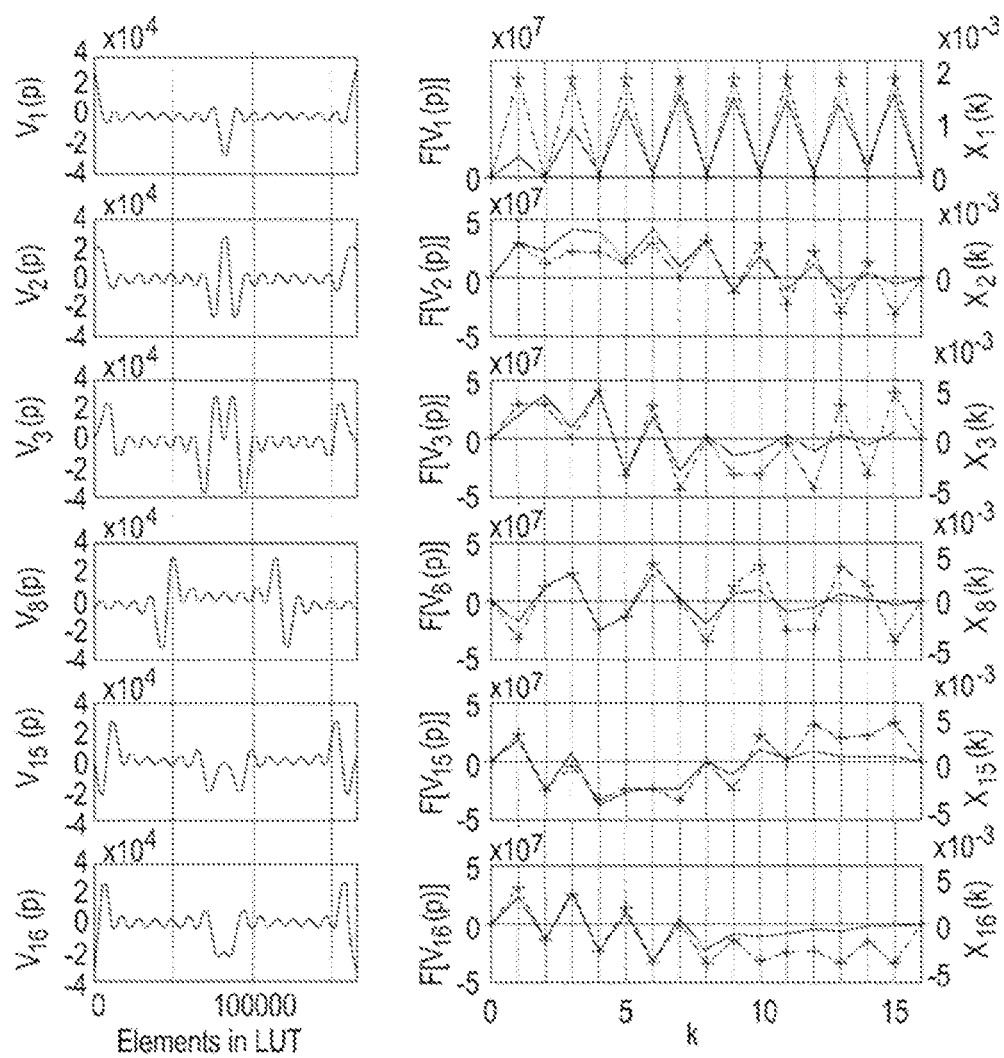
FIG. 6 shows, in graph form, excitation signals and certain of their properties.

FIG. 6 shows, in the graphs of the left-hand side, the excitation signals of six of the sixteen electrodes 2. Each signal is made up of a sum of 15 sinusoidal functions.

The continuous lines of the graphs on the right-hand side of FIG. 6 represent, in the equivalent Fourier space, the amplitudes of the voltages $V^{meas}$ measured across the resistors R shown in FIG. 2, with R=200Ω. The dash-dotted lines represent the Fourier transforms of the voltages of the generated signals.

The invention is not limited to the examples that have just been described: features of the illustrated examples may in particular be combined together within variants that have not been illustrated.

Further variants and improvements may be envisioned without however departing from the scope of the invention. In particular, the method according to the invention may be implemented by means of acquiring systems other than the one described.

LIST OF CITED REFERENCES

[1] Teague, G. (2002). *Mass flow measurement of multiphase mixtures by means of tomographic techniques*. University of Cape Town, Faculty of Engineering, Department of Electrical Engineering.

[2] Dupré, A., Mylvaganam, S. (2017). *Simultaneous and Continuous Excitation Strategy for High Speed EIT: the ONE-SHOT method*. In Proceedings of the 9th World Congress on Industrial Process Tomography, pages 667-674.

[3] Darnajou, M., Dupré, A., Dang, C., Ricciardi, G., Bourennane, S., Bellis, C. (2019). *On the implementation of simultaneous multi-frequency excitations and measurements for electrical impedance tomography*. Sensors, 19(17).

[4] Darnajou, M., Dupré, A., Dang, C., Ricciardi, G., Bourennane, S., Bellis, C., Mylvaganam, S. (2020). *High Speed EIT with Multifrequency Excitation using FPGA and Response Analysis using FDM*. IEEE Sensors.

[5] https://www.math.colostate.edu/~siamcsu/files/NOSER.pdf

The invention claimed is:

1. An electrical-impedance-tomography measuring method of a body comprising a cylindrical portion containing a fluid, the method comprising:
arranging a number $n_e$ of electrodes around a periphery of the cylindrical portion of the body,
simultaneously exciting each of the $n_e$ electrodes, each electrode being excited by a potential $V_n^{exc}$ having a form:

$$V_n^{exc}(t) = A \sum_{m=1}^{n_e} \cos(2\pi f_m t)\left[\delta_m^O \cos(m\theta_n) + \delta_m^E \sin\left(\frac{m\theta_n}{2}\right)\right]$$

where A is a signal amplitude, $\theta_n$ is an angular position of electrode n, $f_m = m*f_0$ is an oscillation frequency, $f_0$ is a fundamental frequency chosen such that $f_m$ is less than a Nyquist frequency of the system for all m, $\delta$ is the Kronecker delta, and $O = \{2k+1 : k \in \mathbb{N}\}$ is the set of odd integers $E = \{2k : k \in \mathbb{N}^*\}$ is the set of non-zero even integers, measuring electrical properties $V_n^{meas}$ of the body using the electrodes, and
processing data generated in the measuring step, by:
a) for each electrode $E_n$, computing data points $M_n$ defined by:

$$M_n(k) = \frac{1}{RP}\left|\sum_{p=0}^{P-1} V_n^{meas}(p) e^{ik\beta_p}\right|$$

where R is a resistance of a resistor used to measure $V_n^{meas}$ with $V_n^{meas} = R\, I_n$ across terminals of the resistor, P is a number of points in a discrete sequence of measurement of the current $I_n$, p is a discrete time, k is a Fourier coefficient comprised between 1 and $(n_e-1)$ and $\beta_p = (2\pi p/P)$,
b) constructing a data matrix D from the data points $M_n(k)$ for all n and for all k, according to the equation:

$$D = \begin{pmatrix} \{M_n(1)\} \\ \{M_n(2)\} \\ \{M_n(3)\} \\ \vdots \\ \{M_n(n_e - 1)\} \end{pmatrix} [[.]],$$

and
c) constructing a signed data matrix, the elements of which are defined by the following equation when a phase shift $\Phi_{n,l}(k)$ between an excitation potential at electrode 1 and a current measured at electrode n is less than $\pi/2$:

$$\tilde{D}_n^m = \frac{\sin(\Phi_{n,l}(k))}{|\sin(\Phi_{n,l}(k))|} D_n^m [[.]]$$

and the elements of which are defined by the following equation when the phase shift $\Phi_{n,l}(k)$ between the excitation potential at electrode 1 and the current measured at electrode n is greater than or equal to $\pi/2$:
$\tilde{D}_n^m = \Sigma_n^m D_n^m$ where $\Sigma$ is a sign matrix defined such that an i-th element of a j-th row of $\Sigma$ is the sign of cosine $([2\pi/([j-1]/2)]*(i-1)/n_e)$ for odd j and a sign of sine $([2\pi/(j/2)]*(i-1)/n_e)$ for even j.

2. The method as claimed in claim 1, wherein the set of potentials $V_n^{exc}$ satisfy the condition:

$$\sum_{n=1}^{n_e} V_n^{exc}(t) = 0.$$

3. The method as claimed in claim 2, wherein an image is produced using a one-step iterative least-squares reconstruction algorithm applied to the signed data matrix.

4. The method as claimed in claim 1, wherein the electrodes are angularly distributed in a regular manner around a periphery of the body.

5. The method as claimed in claim 1, further comprising performing tomographic measurement of a two-phase flow, the body being a pipe of a nuclear installation.

6. A computer program product comprising a non-transitory computer-readable medium storing instructions that are readable by a processor so that, when executed, the instructions cause an acquiring system to be controlled in order to implement the measuring method as claimed in claim 1.

7. A device for implementing the method as claimed in claim 1, the device comprising:
an acquiring system comprising at least one programmable logic array, a module for generating analog signals, and a module for measuring analog signals;
a computer configured to control the acquiring system; and
a plurality of electrodes connected to the acquiring system.

* * * * *